(12) United States Patent
Schroder et al.

(10) Patent No.: US 6,431,555 B1
(45) Date of Patent: Aug. 13, 2002

(54) LEAF SEAL FOR INNER AND OUTER CASINGS OF A TURBINE

(75) Inventors: Mark Stewart Schroder, Hendersonville, NC (US); David Leach, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/805,359

(22) Filed: Mar. 14, 2001

(51) Int. Cl.[7] ............................. F16J 15/02; F01D 25/00
(52) U.S. Cl. ..................... 277/628; 277/628; 277/630; 277/632; 415/230
(58) Field of Search ............................ 415/230, 231; 277/632, 630, 628

(56) References Cited

U.S. PATENT DOCUMENTS

| 4,405,137 A | 9/1983 | Webb |
| 4,662,658 A | 5/1987 | Holowach et al. |
| 5,074,748 A | 12/1991 | Hagle |
| 5,118,120 A | 6/1992 | Drerup et al. |
| 5,143,292 A | 9/1992 | Corsmeier et al. |
| 5,797,723 A | 8/1998 | Frost et al. |
| 6,164,656 A | * 12/2000 | Frost ........................... 277/312 |

* cited by examiner

Primary Examiner—Anthony Knight
Assistant Examiner—Enoch E Peavey
(74) Attorney, Agent, or Firm—Nixon & Vanderhye

(57) ABSTRACT

A plurality of arcuate, circumferentially extending leaf seal segments form an annular seal spanning between annular sealing surfaces of inner and outer casings of a turbine. The ends of the adjoining seal segments have circumferential gaps to enable circumferential expansion and contraction of the segments. The end of a first segment includes a tab projecting into a recess of a second end of a second segment. Edges of the tab seal against the sealing surfaces of the inner and outer casings have a narrow clearance with opposed edges of the recess. An overlying cover plate spans the joint. Leakage flow is maintained at a minimum because of the reduced gap between the radially spaced edges of the tab and recess, while the seal segments retain the capacity to expand and contract circumferentially.

13 Claims, 4 Drawing Sheets

LEAF SEAL FOR INNER AND OUTER CASINGS OF A TURBINE

This invention was made with Government support under Contract No. DE-FC21-95MC31176 awarded by the Department of Energy. The Government has certain rights in this invention.

BACKGROUND OF THE INVENTION

The present invention relates to a seal between sealing surfaces on inner and outer turbine casings for sealing between high and low pressure regions on opposite sides of the seal and particularly relates to arcuate leaf seal segments having a tab-and-groove arrangement along adjoining ends cooperable with the sealing surfaces for minimizing leakage flow through the seal.

In an advanced gas turbine design, an annular inner casing is mounted for radial and axial expansion and contraction relative to a surrounding annular outer casing. Each casing comprises a pair of generally semi-circular casing halves joined at their midline to one another. The inner casing mounts the first and second-stage nozzles and shrouds for the turbine, as well as ancillary parts for, among other things, carrying cooling circuits for the nozzles and shrouds. The outer casing is stationary and mounts the combustors and ancillary parts including for supplying the cooling medium to the inner casing, the shrouds and nozzle stages. Compressor discharge air at high pressure is supplied in a region forwardly of the inner casing and a portion of the outer casing for flow to the turbine combustors. A lower pressure region lies between the inner and outer casings and which region extends aft from an axial location along the turbine corresponding generally to the first bucket. It has been the practice to provide an annular seal between adjacent annular sealing surfaces on the inner and outer casings to seal between these high and low pressure regions.

Because of the relative radial and axial expansion of the inner and outer casings, it has been customary to provide a series of arcuate leaf seals carried by the inner casing in arcuate end-to-end relation relative to one another and overlying radially spaced, axially forwardly facing sealing surfaces of the inner and outer casings. This end-to-end sealing arrangement provides circumferentially extending gaps between end edges of each pair of adjacent leaf seals necessary to accommodate expansion and contraction of the casings and preclude arch binding of the seals. To minimize the flow through each gap, a cover plate overlies adjoining ends of the leaf seals along a surface of the seals opposite from the sealing surfaces of the inner and outer casings. While these leaf seals with cover plates have reduced the flow from the high to the low pressure regions, significant leakage remains. For example, with the seals engaging the radially spaced circumferentially extending sealing surfaces of the inner and outer casings and the cover plate overlying the gaps between adjoining ends of the seal plates, high pressure flow occurs between the overlying cover plate and the circumferential gap between registering end edges of the seal plates. Accordingly, there is a need to provide a seal which will further minimize flow between the high and low pressure regions on opposite sides of the seal plates.

BRIEF SUMMARY OF THE INVENTION

In accordance with a preferred embodiment of the present invention, there is provided arcuately segmented seal plates for sealing against radially spaced, axially facing sealing surfaces of the inner and outer casings for eliminating or minimizing the leakage flow between high and low pressure regions on opposite sides of the seal. Particularly, the seal includes a plurality of arcuate segmented seal plates disposed in an annular array thereof about the rotor axis between the high and low pressure regions. The seal plates are preferably carried by the inner casing and have sufficient radial extent to seal against the annular sealing surfaces of both the inner and outer casings. At the registering adjacent end edges of the seal plates, there is provided a projecting tab on a first end of a first seal plate and a recess on a second end of the registering seal plate for receiving the tab. The tab has circumferentially extending, radially spaced sealing portions or edges which seal against the respective arcuate sealing surfaces of the inner and outer casings. The end edge of the tab, as well as the end edges straddling the tab at the first end of the first seal plate, are respectively spaced circumferentially from the edge at the base of the recess and the end edges straddling the recess at the second end of the second seal plate to provide circumferential gaps therebetween. These circumferentially offset and circumferentially extending gaps enable the seal plates to expand and contract in circumferential directions relative to one another without engaging or binding up one another.

To minimize or eliminate the leakage flow past this circumferential gap between adjacent arcuate seal plates, a cover plate overlies the first and second ends of the respective plates. The cover plate is secured, for example, by welding to one of the seal plates and overlies the adjacent seal plate spanning the gap between the plates. The reduced leakage flow is created by reducing the size of the flow path, together with a flow turn. That is, with the radially spaced edges of the tab engaging the sealing surfaces of the inner and outer casings, a reduced clearance between those edges and the radially spaced edges of the recess significantly reduces the leakage flow through the juncture of the seal plates between the high and low pressure regions. Concurrently, the circumferential gap between adjacent seal plates remains the same as in the prior seals, enabling the leaf seal plates to circumferentially expand and contract relative to one another.

In a preferred embodiment according to the present invention, there is provided in a turbine having radially spaced inner and outer casings and generally annular sealing surfaces, a seal for sealing across the sealing surfaces and between high and low pressure regions on opposite sides of the seal, the seal comprising first and second seal segments disposed in a generally common plane in end-to-end relation to one another, a first end of the first segment having a projection and a second end of the second segment in opposition to the first end having a recess for receiving the projection, the first and second ends having edges defining circumferentially extending gaps therebetween, the projection having radially spaced edges for sealingly engaging the respective sealing surfaces of the inner and outer casings and radially spaced edges of the recess in opposition to respective edges of the projection defining radial gaps therebetween each having a smaller gap width than the width of each of the circumferential gaps between the first and second ends.

In a further preferred embodiment according to the present invention, there is provided in a turbine having radially spaced inner and outer casings and generally annular sealing surfaces, an annular seal for sealing across the sealing surfaces and between high and low pressure regions on opposite sides of the seal, the seal comprising first and second elongated arcuate seal segments disposed in a generally common plane in spaced circumferential end-to-end relation to one another, a first end of the first segment having a circumferentially extending tab and a second end of the second segment in opposition to the first end having a circumferentially opening recess for receiving the tab, the first and second ends defining circumferentially extending gaps therebetween, the tab having radially spaced, circumferentially-extending edges for sealingly engaging the respective sealing surfaces of the inner and outer casings, radially spaced edges of the recess in opposition to the radially spaced edges of the tab defining radially extending gaps therebetween each having a smaller gap width than the width of each of the circumferential gaps between the first and second ends and a cover plate overlying the first and second ends and the gaps to minimize flow between the high and low pressure regions across the seal.

DETAILED DESCRIPTION OF THE INVENTION

Figure 1:
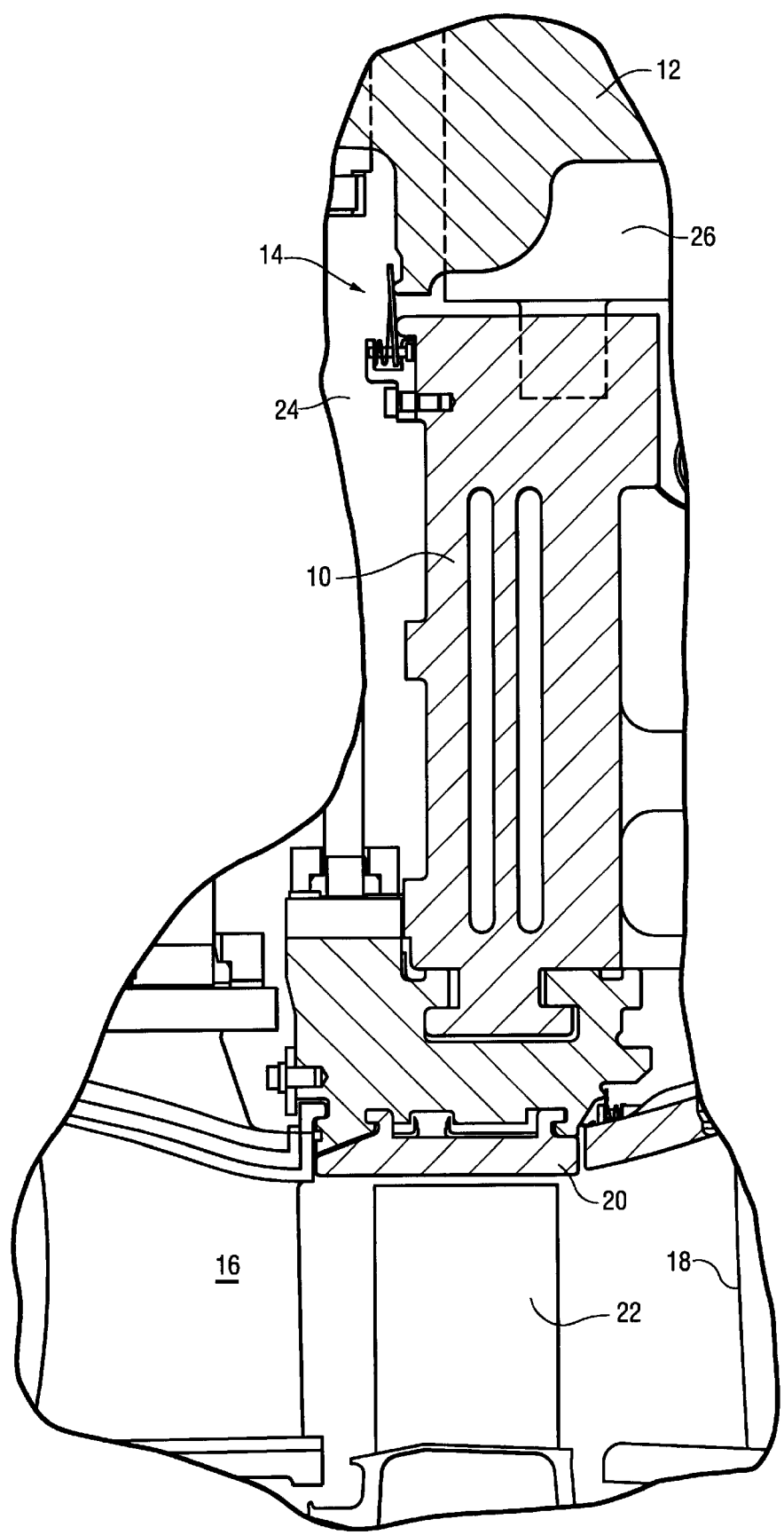
FIG. 1 is a fragmentary off-axis radial cross-sectional view of a portion of the first stage of a gas turbine illustrating inner and outer casings thereof and a leaf seal therebetween.

Referring now to the drawings, particularly to FIG. 1, there is illustrated a portion of a gas turbine including an inner shell or casing 10, an outer shell or casing 12 and a seal 14 constructed in accordance with the present invention sealing between axially forwardly facing sealing surfaces along the inner casing 10 and outer casing 12. It will be appreciated that both the inner and outer casings 10 and 12, respectively, are annular in shape about the axis of the turbine rotor with each being formed in two semi-circular halves joined at a midline. The inner casing 10 is joined to the outer casing 12 by a plurality of pins, not shown, arranged about the axis and which may be of the type described and illustrated in U.S. Pat. No. 6,079,943, of common assignee herewith, the disclosure of which is incorporated herein by reference. The inner shell 10 carries the first and second stage nozzles 16 and 18 and shrouds 20 about the first and second-stage buckets, one shroud being illustrated surrounding a first-stage bucket 22. The stages, of course, receive the hot gases of combustion from a combustor which, in turn, is supplied with high pressure compressor discharge air from a high pressure region 24 forwardly of the seal 14. Between the inner and outer casings 10 and 12, respectively, is a low pressure region 26. The seal 14 hereof seals between the high and low pressure regions 24 and 26, respectively, with minimized leakage flow between the regions.

Figure 2:
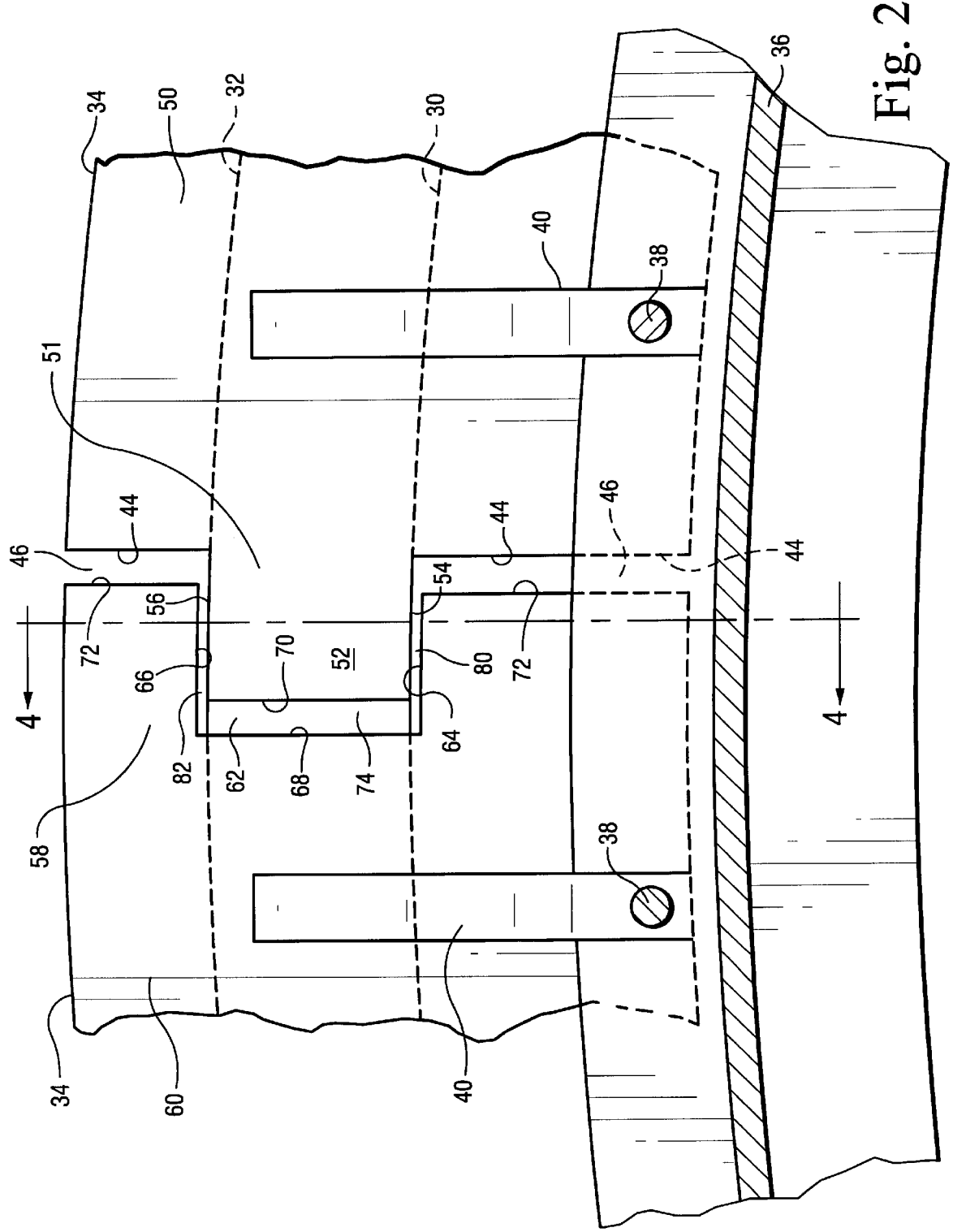
FIG. 2 is an enlarged axial cross-sectional view of the seal of FIG. 1 taken about on line 2—2 in FIG. 4.
Figure 3:
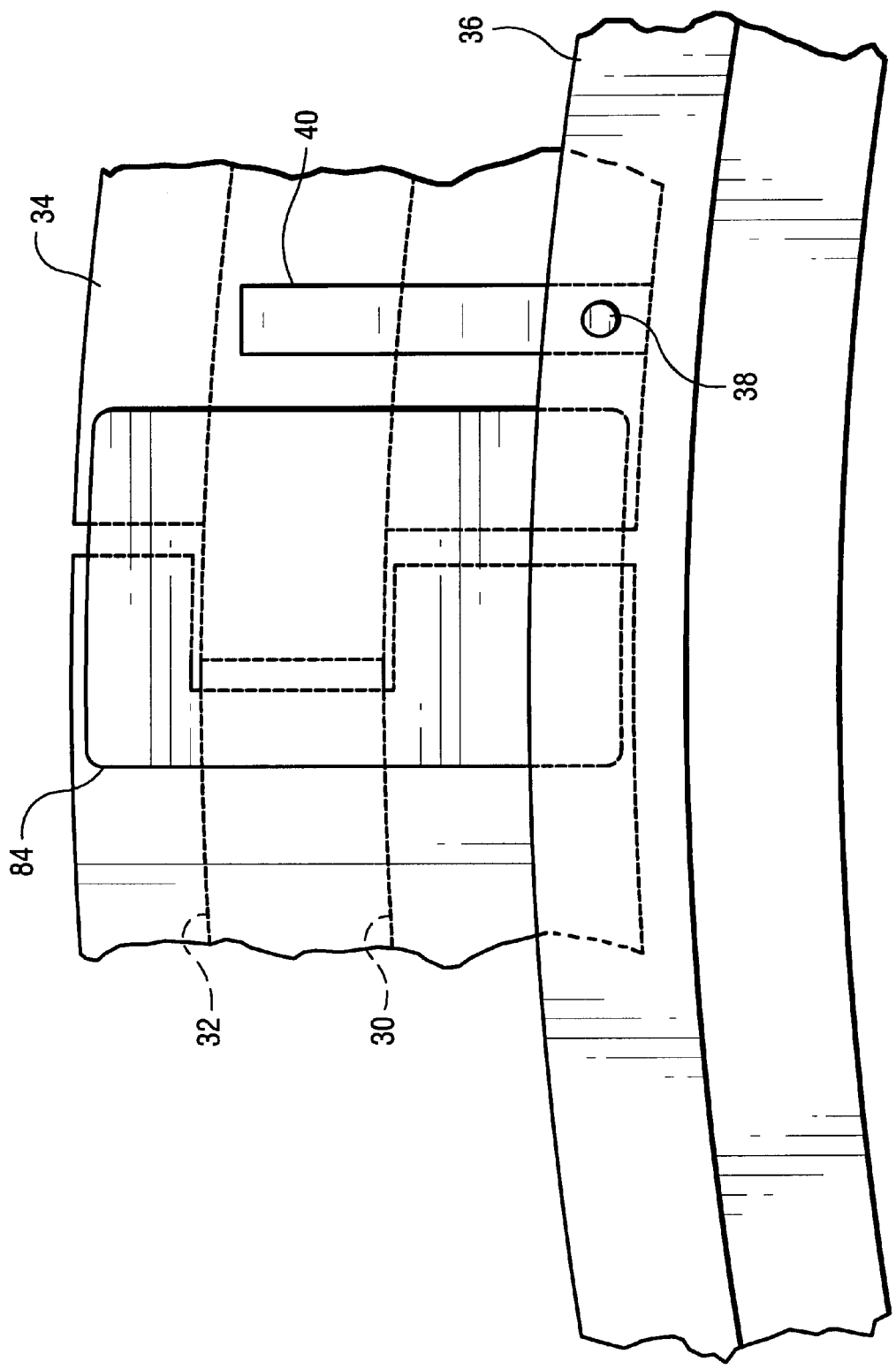
FIG. 3 is a fragmentary axial view of the seal looking from left to right in FIG. 1.
Figure 4:
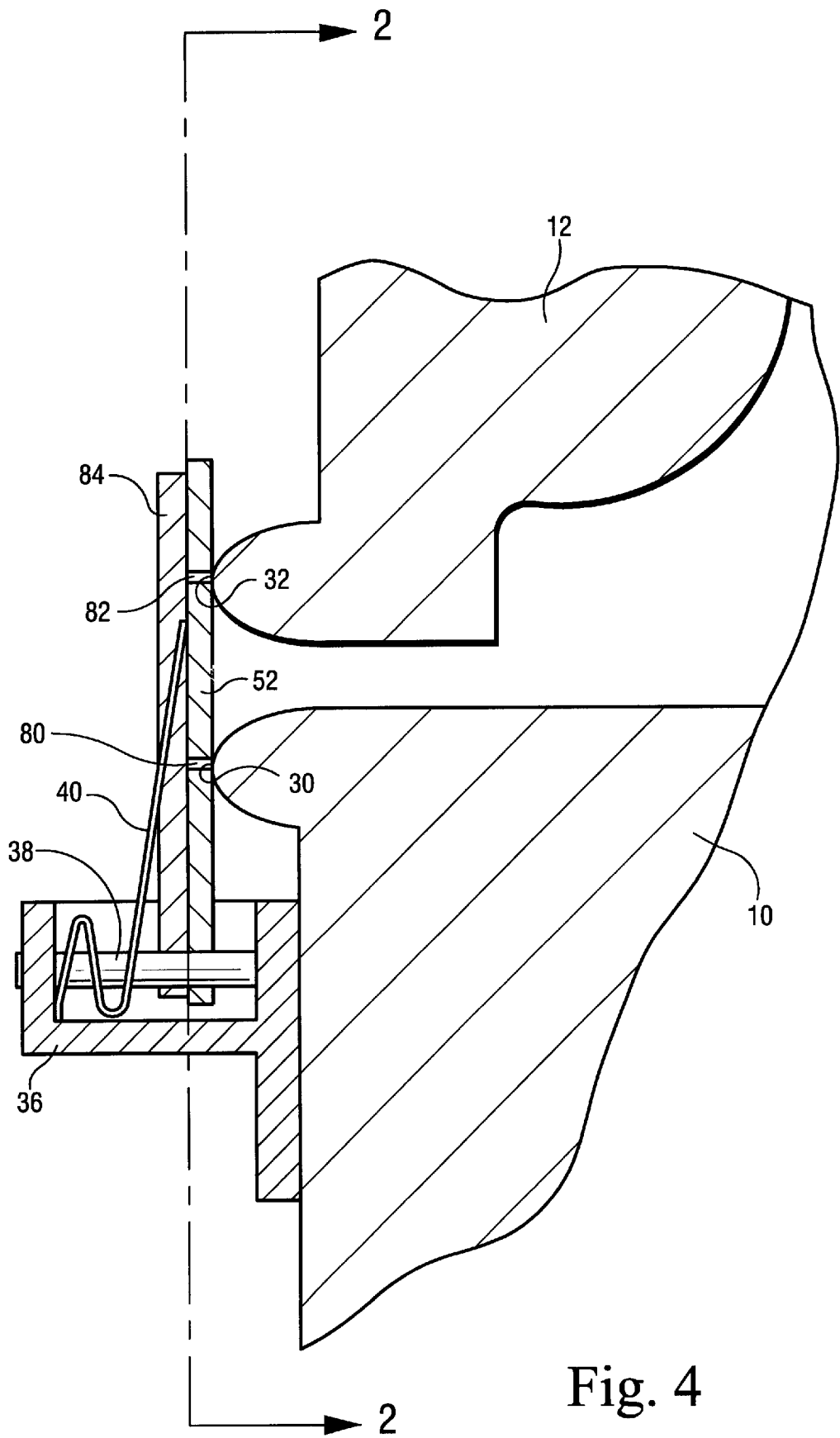
FIG. 4 is an enlarged cross-sectional view illustrating the sealing surfaces of the seal plate tab and the sealing surfaces of the inner and outer casings taken generally about on line 4—4 in FIG. 2.

Referring now to FIG. 4, the inner and outer casings have contact or sealing surfaces 30 and 32, respectively, which are annular about the rotor axis. The seal 14 spans in a radial direction between the inner and outer casings in sealing contact with the sealing surfaces 30 and 32. Because the inner casing 10 expands and contracts in radial and axial directions relative to the outer casing 12, the seal 14 between the casings is comprised of a plurality of arcuate leaf seal plates or segments 34 (FIGS. 2 and 3) disposed in end-to-end relation to one another about the rotor axis. Each seal segment 34 is supported along an arcuate inner portion thereof by the inner shell 10 and a leaf seal segment carrier 36 (FIG. 4) secured to the inner shell. The carrier 36 is fixed to the inner shell, preferably by bolts, and includes a plurality of pins 38 at circumferentially spaced positions along the carrier which are disposed in circumferential slots along the inner edge portion of the seal plates 34 (FIG. 3). A leaf spring 40 extends about each pin 38 and includes a radial outward directed blade bearing against the forward axial surface of a seal plate 34. At least two or more springs 40 are provided each seal plate for initially maintaining each seal plate 34 in engagement with the sealing surfaces 30 and 32.

To accommodate the circumferential expansion and contraction of the seal plates 34 relative to one another, the end edges 44 (FIG. 2) of adjoining seal plates are spaced one from another, forming a radially extending gap 46. If, as in conventional leaf seal construction, the gap extends linearly and radially between the circumferentially opposed end edges of the leaf seals, the portion of the circumferential gap 46 between the seal surfaces 30 and 32, even with a cover plate spanning the joint between the ends of the adjacent seal plates, would provide a significant leakage path between the high and low pressure regions 24 and 26, respectively.

In accordance with a preferred embodiment of the present invention, the leakage path through the circumferential gap between adjacent ends of the seal plates is minimized by changing the configuration of the seal at the juncture of adjacent seal plates. With reference to FIG. 2, a first seal segment, e.g., plate 50, of the plurality of seal plates 34 is provided with a projection, e.g., an end tab 52, adjacent a first end 51 thereof. The end tab 52 has inner and outer radially spaced, circumferentially extending edges 54 and 56, respectively. The second end 58 of a second seal segment, e.g., plate 60, of the plurality of seal plates 34 has a generally corresponding recess 62 for receiving the tab 52. The recess 62 is bounded by inner and outer radially spaced, circumferentially extending edges 64 and 66, respectively, and a radially extending edge 68 along the base of the recess in circumferential opposition to a radially extending edge 70 at the end of tab 52. The edges 44 and 70 of the first seal plate 50 and the edges 72 and 68 of the second end 58 of the second seal plate 60 respectively define equal circumferentially extending and offset gaps 46 and 74, respectively. Additionally, the radial inner edges 54 and 64 of tab 52 and recess 62, respectively, form an inner gap 80 therebetween. Similarly, the radial outer edges 56 and 66 of tab 52 and recess 62, respectively, form an outer gap 82 therebetween. Gaps 80 and 82 are radially spaced from one another. The gap 74 between end edges 70 of tab 52 and end edge 68 of recess 62 lies generally parallel to gap 46. In addition, a cover plate 84 (FIG. 3) overlies the joint between each adjoining end of the seal plates 50 and 60 on the axial forward side of the segments 34. The cover plate 84 is secured, preferably welded, to one or the other of the end of a segment and is in overlying sliding relation to the other segment.

In accordance with the present invention, the radial inner and outer gaps 80 and 82 are provided with minimum clearances between the edges 54, 56 of the tab and edges 64, 66 of the recess forming the gaps 82 and 80, respectively. Those clearances are considerably tighter than the clearances defining gaps 46 and 74. Thus, the width of the radial gaps 80, 82 is less than the width of the circumferential gaps 46, 74. This results from only having to accommodate the thermal expansion/contraction of small components 52 and 62, respectively. Gaps 46 and 74 accommodate the thermal expansion of inner shell 10 having a much greater dimension than that of tab 52 and recess 62. Additionally, the edges 54 and 56 are designed to maintain sealing contact with the sealing surfaces 30 and 32, respectively, throughout the full operating range of the turbine. With the cover plate 84 applied over the adjoining ends of the segments 34, the leakage path from the high pressure region to the low pressure region at each joint includes the circumferentially spaced gaps 46, the radial inner and outer gaps 80 and 82 and the circumferential gap 74 between the end edge 70 of the tab 52 and the edge 68 of recess 62. However, because the radial inner and outer gaps 80 and 82, respectively, are dimensioned for a very narrow clearance therebetween and because the edges 54 and 56 are maintained in sealing contact with the sealing surfaces 30 and 32 of the inner and outer casings, only a very narrow passage along those radial inner and outer gaps remains available for flow of leakage air. Further, the leakage path includes a 90° turn from the circumferential gap 46 into the circumferentially extending radial inner and outer gaps 80 and 82. Thus, the majority of any leakage flow cannot pass directly axially through the seal but first must pass radially, circumferentially and then axially. The radially spaced gaps 80, 82 are very narrow, have tight clearances, and minimize the leakage flow, while at the same time, the gaps 46, 74 permit radial expansion of the seal plate segments 34 relative to one another to prevent arch binding.

It will also be appreciated that at steady state operation, the high pressure region on the axial forward faces of the leaf seals maintains the leaf seals in engagement with the sealing surfaces 30 and 32 of the inner and outer casings. Consequently, the springs 40 serve only to maintain the leaf seal plates initially biased against the sealing surfaces 30 and 32, the contact between the sealing surfaces 30, 32 and the leaf seal plates being maintained at steady-state operation by the differential pressure across the seal. Thus, the springs 40 are substantially functionally redundant during steady-state operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having radially spaced inner and outer casings and generally annular sealing surfaces, a seal for sealing across the sealing surfaces and between high and low pressure regions on opposite sides of the seal, said seal comprising:

first and second seal segments disposed in a generally common plane in end-to-end relation to one another, a first end of said first segment having a projection and a second end of said second segment in opposition to said first end having a recess for receiving the projection, said first and second ends having edges defining circumferentially extending gaps therebetween;

said projection having radially spaced edges for sealingly engaging the respective sealing surfaces of the inner and outer casings; and radially spaced edges of said recess in opposition to respective edges of said projection defining radial gaps therebetween each having a smaller gap width than the width of each of the circumferential gaps between said first and second ends.

2. A seal according to claim 1 including a cover plate overlying said first and second ends and said gaps to minimize flow between the high and low pressure regions across said seal.

3. A seal according to claim 2 wherein said cover is secured to one of said first and second seal segments and spans the gaps between the segments to overlie a portion of another of said first and second seal segments.

4. A seal according to claim 1 including a seal carrier carried by one of the inner and outer casings for supporting said seal and a spring carried by said carrier for biasing at least one seal segment into sealing engagement with the sealing surfaces.

5. A seal according to claim 1 wherein the circumferential gaps are substantially uniform throughout their radial extent.

6. A seal according to claim 1 wherein the circumferential gaps have a circumferential extent sufficient to enable expansion and contraction of said segments circumferentially toward and away from one another, respectively.

7. A seal according to claim 1 including a cover plate overlying said first and second ends and said gaps to minimize flow between the high and low pressure regions across said seal, said cover plate being secured to one of said first and second seal segments and spanning the gaps between the segments to overlie a portion of another of said first and second seal segments.

8. A seal according to claim 1 wherein said cover plate is secured to one of said first and second seal segments and spans the circumferential gaps between the segments to overlie a portion of another of said first and second seal segments, a seal carrier carried by one of said inner and outer casings for supporting said seal and a spring carried by said carrier for biasing at least one seal segment into sealing engagement with the sealing surfaces.

9. In a turbine having radially spaced inner and outer casings and generally annular sealing surfaces, an annular seal for sealing across the sealing surfaces and between high and low pressure regions on opposite sides of the seal, said seal comprising:

first and second elongated arcuate seal segments disposed in a generally common plane in spaced circumferential end-to-end relation to one another, a first end of said first segment having a circumferentially extending tab and a second end of said second segment in opposition to said first end having a circumferentially opening recess for receiving the tab, said first and second ends defining circumferentially extending gaps therebetween;

said tab having radially spaced, circumferentially-extending edges for sealingly engaging the respective sealing surfaces of the inner and outer casings;

radially spaced edges of said recess in opposition to said radially spaced edges of said tab defining radially extending gaps therebetween each having a smaller gap width than the width of each of the circumferential gaps between said first and second ends; and a cover plate overlying said first and second ends and said gaps to minimize flow between the high and low pressure regions across said seal.

10. A seal according to claim 9 wherein said cover plate is secured to one of said first and second seal segments and spans the circumferential gaps between the segments to overlie in sliding relation a portion of another of said first and second seal segments.

11. A seal according to claim 9 including a seal carrier carried by one of said inner and outer casings for supporting said seal and a spring carried by said carrier for biasing at least one seal segment into sealing engagement with the sealing surfaces.

12. A seal according to claim 9 wherein the circumferential gaps are substantially uniform in width throughout the radial extents of the gaps.

13. A seal according to claim 9 wherein the circumferential gaps have a circumferential extent sufficient to enable expansion and contraction of said segments circumferentially toward and away from one another, respectively, during operation of the turbine.

* * * * *